United States Patent
Chen et al.

(10) Patent No.: US 12,452,364 B2
(45) Date of Patent: Oct. 21, 2025

(54) USER EQUIPMENT SIGNALING OF CUSTOMIZE RINGING SIGNAL CAPABILITY

(71) Applicant: QUALCOMM Incorporated, San Diego, CA (US)

(72) Inventors: Chen Chen, Beijing (CN); Yong Xie, San Diego, CA (US); Yong Hou, Beijing (CN); Yueming Teng, Beijing (CN); Grace Wang, Beijing (CN); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 18/002,254

(22) PCT Filed: Feb. 13, 2021

(86) PCT No.: PCT/CN2021/076638
§ 371 (c)(1),
(2) Date: Dec. 16, 2022

(87) PCT Pub. No.: WO2022/033007
PCT Pub. Date: Feb. 17, 2022

(65) Prior Publication Data
US 2023/0216954 A1 Jul. 6, 2023

(30) Foreign Application Priority Data

Aug. 13, 2020 (WO) ................ PCT/CN2020/108906

(51) Int. Cl.
*H04M 3/00* (2024.01)
*H04M 3/02* (2006.01)
(Continued)

(52) U.S. Cl.
CPC ......... *H04M 3/42136* (2013.01); *H04M 3/02* (2013.01); *H04L 65/1104* (2022.05)

(58) Field of Classification Search
CPC .. H04M 3/42136; H04M 3/02; H04L 65/1104
See application file for complete search history.

(56) References Cited

U.S. PATENT DOCUMENTS

| 2007/0140150 A1* | 6/2007 | Beck ................... H04L 65/1069 370/279 |
| 2007/0140299 A1* | 6/2007 | Hofmann ............... H04N 7/163 370/395.2 |

(Continued)

FOREIGN PATENT DOCUMENTS

| CN | 1780304 A | 5/2006 |
| CN | 101389049 A | 3/2009 |

(Continued)

OTHER PUBLICATIONS

Supplementary European Search Report—EP21855063—Search Authority—The Hague—Nov. 14, 2023 6 pages.

(Continued)

*Primary Examiner* — Khai M Nguyen
(74) *Attorney, Agent, or Firm* — Polsinelli LLP

(57) ABSTRACT

Embodiments include systems and methods for wireless device signaling a network regarding customized ringing signal (CRS) capability and use of such information by the network. Various embodiments may receiving from the network an INVITE message notifying the wireless device of an incoming call, determining whether the INVITE message indicates that the network provides CRS service if the wireless device supports a CRS function, and including an indication in a response to the INVITE that the wireless device supports the CRS function in response to determining that the INVITE message includes an alert information header field indicating that the network provides CRS ser- (Continued)

vice. Various embodiments include a network computing device receiving such information and performing negotiations for CRS service with the wireless device only if the wireless device indicates CRS functional capability.

17 Claims, 9 Drawing Sheets

(51) Int. Cl.
   *H04M 3/42* (2006.01)
   *H04L 65/1104* (2022.01)

(56) References Cited

U.S. PATENT DOCUMENTS

| | | | | |
|---|---|---|---|---|
| 2007/0172051 | A1* | 7/2007 | Hoffmann | H04M 7/006 379/360 |
| 2008/0192733 | A1* | 8/2008 | Song | H04L 69/24 370/352 |
| 2009/0257433 | A1 | 10/2009 | Mutikainen et al. | |
| 2022/0021765 | A1* | 1/2022 | Deng | H04M 3/42017 |
| 2024/0089369 | A1* | 3/2024 | Deng | H04L 65/1063 |

FOREIGN PATENT DOCUMENTS

| | | | |
|---|---|---|---|
| CN | 101795330 A | 8/2010 | |
| CN | 101888605 A * | 11/2010 | |
| CN | 102036190 A | 4/2011 | |
| CN | 102131010 A | 7/2011 | |
| CN | 101409952 B | 11/2012 | |
| CN | 106302419 B * | 8/2019 | H04L 65/1069 |
| CN | 111049778 A | 4/2020 | |
| WO | 2006125474 A1 | 11/2006 | |
| WO | 2010054558 A1 | 5/2010 | |
| WO | 2011091848 A1 | 8/2011 | |

OTHER PUBLICATIONS

Taiwan Search Report—TW110119072—TIPO—Nov. 29, 2024.
Huawei, et al., "Use Precondition for CRS When Terminating UE Supports or Requires Precondition," 3GPP TSG-CT WG1 Meeting #122-e, C1-200485, Electronic meeting, Feb. 20-28, 2020, Feb. 17, 2020 (Feb. 17, 2020), sections 4.5.5.3.6, A.x.2, A.x.3, 9 pages.
International Search Report and Written Opinion—PCT/CN2020/108906—ISA/EPO—May 12, 2021.
International Search Report and Written Opinion—PCT/CN2021/076638—ISA/EPO—May 12, 2021.
ZTE: "Procedure About how to Insert the Indication for CRS Media", 3GPP TSG-CT WG1 Meeting #64, C1-101856, May 14, 2010, (May 14, 2010), 3 Pages, the whole document.
Huawei, et al., "Use Precondition for CRS When Terminating UE Supports or Requires Precondition", 3GPP TSG-CT WG1 Meeting #122-e, C1-200485, Electronic meeting, Feb. 20, 2020-Feb. 28, 2020, 9 Pages, Feb. 17, 2020, pp. 5-7.
Huawei, et al., "Use Precondition for CRS When Terminating UE Supports or Requires Precondition", 3GPP TSG-CT WG1 Meeting #122-e, C1-201047, Electronic meeting, Feb. 20, 2020-Feb. 28, 2020, 4 Pages, Feb. 27, 2020.

* cited by examiner

USER EQUIPMENT SIGNALING OF CUSTOMIZE RINGING SIGNAL CAPABILITY

RELATED APPLICATIONS

This application claims the benefit of priority as a national stage application of PCT Application No. PCT/CN2021/076638 entitled "User Equipment Signaling of Customize Ringing Signal Capability" filed 13 Feb. 2021, which claims priority to PCT Application No. PCT/CN2020/108906 entitled "User Equipment Signaling of Customize Ringing Signal Capability" filed 13 August 2020, both of which are incorporated herein by reference for all purposes.

BACKGROUND

Customized Ringing Signal (CRS) service is an operator specific service which is subscribed by called party, by which an operator can play audio/video announcement to the called party during the Ringing stage of the establishment of a communication. Three models are defined in current wireless standards; a 'Download-and-play' model, an 'Early-session' model, and a 'Gateway' model.

The 'Download-and-play' model refers primarily to a method in which the network inserts an Alert-info header field with a specific Uniform Resource Locator (URL) in the initial INVITE request message that is forwarded to the user equipment (UE) of the called party (referred to herein as the "terminating UE"), which enables the terminating UE to fetch and display the CRS media from the URL.

In the 'Early-session' model, the CRS media is negotiated separately through an early-session between the network and the UE, which is different from the regular session, and the terminating UE will display the media from in-band Real-time Transport Protocol (RTP) flow after signaling the network that the UE is ringing (i.e., after sending the so called 180 Ringing message).

Different from 'Early-session' model, the 'Gateway' model conveys the CRS media during the regular session. Specifically, the regular session will be negotiated back to the original call after called party picks up the call. The terminating UE also displays the CRS media from in-band RTP flow after sending the 180 Ringing message. The Gateway' model is popular with operators in live networks, as providing this service could be a revenue generating business that is easy to implement.

SUMMARY

Various aspects include systems and methods for signaling capabilities of a wireless device for supporting CRS service, enabling networks and the wireless device to skip CRS-related signaling when the wireless device does not support such services.

Some aspects may be performed by a processor of a wireless device and include receiving from a network an INVITE message notifying the wireless device of an incoming call, determining whether the INVITE message indicates that the network provides CRS service if the wireless device supports CRS functionality, and including an indication in a response to the INVITE that the wireless device supports the CRS function in response to determining that the INVITE message includes an alert information header field indicating that the network provides CRS service.

In some aspects, determining whether the INVITE message indicates that the network provides CRS service may further include determining whether the INVITE message includes an alert information header field indicating that the network provides CRS service. In some aspects, determining whether the INVITE message includes an alert information header field indicating that the network provides CRS service may further include determining whether the alert information header field includes a universal resource name (URN) identifying CRS as a network service.

In some aspects, including an indication in a response to the INVITE if the wireless device supports a CRS function may further include inserting an identifier of CRS function support in a first reliable session initiation protocol (SIP) message sent to the network in reply to the INVITE message. In some aspects, the identifier of CRS function support in the first reliable SIP message sent to the network in response to the INVITE message may further include a media feature tag indicating support for Gateway CRS that is included within a contact header field of the SIP message.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

Some aspects may be performed by a processor of a network computing device, such as a base station, and may include transmitting an INVITE message to a wireless device informing the wireless device of an incoming call in which the INVITE message includes an indication that the network provides CRS service, receiving a response to the INVITE message from the wireless device, determining whether the response to the INVITE message indicates that the wireless device supports a CRS function, performing a CRS negotiation with the wireless device in response to determining that response to the INVITE message indicates that the wireless device supports the CRS function, and completing connection of the incoming call without performing the CRS negotiation in response to determining that response to the INVITE message does not indicate that the wireless device supports the CRS function.

In some aspects, the indication that the network provides CRS service included in the INVITE message may further include an alert information header field in the INVITE message that indicates that the network provides CRS service. In some aspects, the alert information header field includes a universal resource name (URN) identifying CRS as a network service.

In some aspects, determining whether the response to the INVITE message indicates that the wireless device supports a CRS function may further include determining whether an identifier of CRS function support is included in a first reliable session initiation protocol (SIP) message received in response to the INVITE message. In some aspects, determining whether an identifier of CRS function support is included in a first reliable session initiation protocol (SIP) message received in response to the INVITE message may further include determining whether media feature tag indicating support for Gateway CRS is included within a Contact header field of the first SIP message.

Further aspects may include a network computing device having a processor configured to perform one or more operations of the methods summarized above. Further aspects may include a non-transitory processor-readable storage medium having stored thereon processor-executable instructions configured to cause a processor of a network computing device to perform operations of the methods summarized above. Further aspects include a network computing device having means for performing functions of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
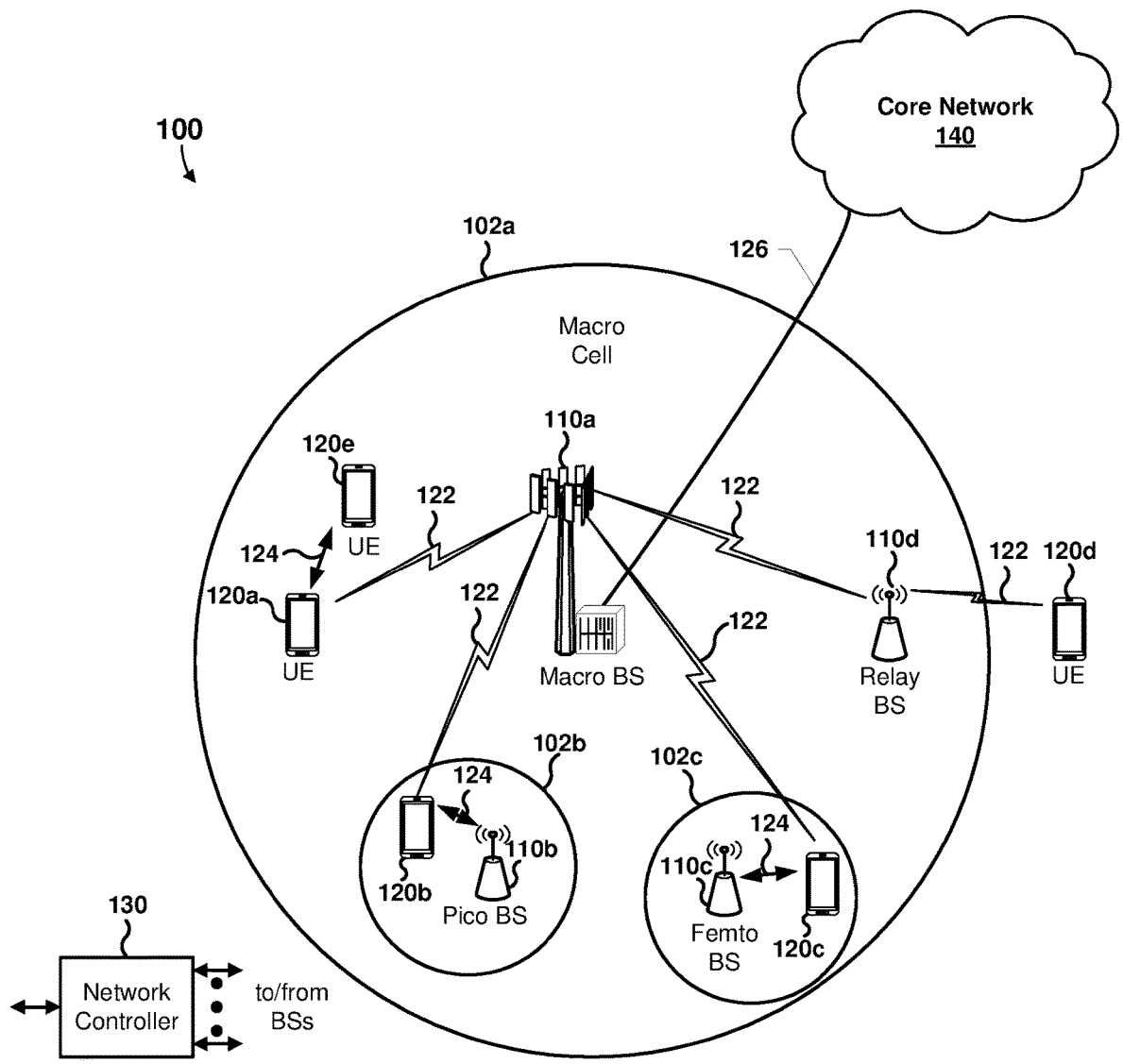
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Wireless communication networks implementing the Gateway CRS service typically have no way of knowing whether a wireless device receiving an incoming phone call is capable of receiving and responding to such services. Thus, the network may be required to attempt to negotiate CRS ring tone delivery with every wireless device as part of the procedure for connecting an incoming phone call. For wireless devices that are capable of supporting CRS functionality (i.e., completing the Gateway CRS negotiation, downloading a ring tone and executing the downloaded ring tone to announce the incoming phone call) will then complete CRS negotiations with the network (at least if Gateway CRS functionality has been collected by the user) in the conventional manner. However, wireless devices that are not capable of supporting CRS functionality will need to respond to the network's CRS negotiation messaging, even though the device is not able to perform the functionality. In that situation, the network CRS negotiating signaling represents unnecessary message traffic and the wireless device will expend battery power replying to messaging that is of no benefit to the user.

Various embodiments include systems, methods and devices implementing the methods for enabling a wireless device to inform a network of its capability to support CRS functionality in response to receiving an incoming call notification message, known as an "INVITE message" from the network. Such information may be conveyed in a first reliable system initiation protocol (SIP) message sent from the wireless device in response to a received INVITE message. Such a SIP message may include a new SIP media feature tag, such as a "g.3gpp.crs-gateway" media feature tag under the Contact header field, if the wireless device is configured to support CRS functionality (i.e., download a special ring tone from the network during the call initiation procedure). Including such a media feature tag in the SIP message responding to the received INVITE message enables the network (e.g., a base station, e-NodeB, g-NodeB, etc.) to determine whether the wireless device is capable of implementing a g.3gpp Gateway CRS process to download and utilize a network-provided ring tone. Armed with this knowledge, the network can determine whether to initiate the CRS negotiation and ring tone download procedure before the wireless device begins sounding audible alert (i.e., a ring tone) announcing the incoming phone call. If the network determines from the received response to the INVITE message that the wireless device is in capable of supporting the CRS service, the network can avoid initiating the CRS negotiation procedure, thereby saving signaling overhead and reducing power drain on the wireless device that would otherwise be consumed by responses to CRS negotiation messaging.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements within autonomous and semiautonomous vehicles, wireless devices affixed to or incorporated into various mobile platforms, and similar electronic devices that include a memory, multiple SIMs, wireless communication components and a programmable processor. In some standards a wireless device is referred to as "user equipment" or "UE."

The term "system-on-chip" (SOC) is used herein to refer to a single integrated circuit (IC) chip that contains multiple resources and/or processors integrated on a single substrate.

A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system-in-a-package" may be used herein to refer to a single module or package that contains multiple resources, computational units, cores and/or processors on two or more IC chips, substrates, or SOCs. For example, a system-in-a-package may include a single substrate on which multiple IC chips or semiconductor dies are stacked in a vertical configuration. Similarly, the system-in-a-package may include one or more multi-chip modules (MCMs) on which multiple ICs or semiconductor dies are packaged into a unifying substrate. A system-in-a-package may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA), IEEE 802.11 (WiFi), IEEE 802.16 (WiMAX), IEEE 802.20, Flash-OFDM®, etc. Reference may be made to wireless networks that use Long Term Evolution (LTE) standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, support wireless communications, including connecting phone calls, with wireless devices in a cell. For ease of reference, the term "network device" or "network computing device" is used to refer to any of a variety of network elements that may perform operations of various embodiments, non-limiting examples of which include a base station, an eNodeB, a gNodeB, etc.

Various embodiments include adding a new SIP media feature tag (e.g., "g.3gpp.crs-gateway") that wireless devices can include in the Contact header field in a first reliable SIP message replying to an INVITE message notifying the wireless device of an incoming call that informs the network regarding whether the wireless device supports CRS functionality. A processor of the wireless device may inspect the INVITE message to determine whether the message indicates that the network provides CRS service. For example, the processor may determine whether the alert information header field in the INVITE message includes a URN identifying CRS as a network service. If the wireless device is configured to support CRS functionality and that the network provides CRS service, the processor may insert the SIP media feature tag indicating support for Gateway CRS within a contact header field of the SIP message.

A network computing device, such as a base station, and may include in incoming call notification INVITE messages information indicating that the network provides CRS services, such as a URN (e.g., "urn:alert:service:crs"). The network computing device may then parse the SIP message received from a wireless device immediately following an INVITE message to determine whether the received SIP message indicates that the wireless device supports Gateway CRS functionality. For example, the network computing device may determine whether the received SIP message includes a media feature tag (e.g., "g.3gpp.crs-gateway") in the Contact header field indicating that the functional entity sending the SIP message supports the "Gateway" model CRS functionality. If so, the network computing device may proceed with performing a CRS negotiation with the wireless device in the conventional manner. However, if the network computing device determines that the received SIP message includes no indication of CRS functionality or a negative indication (e.g., a "0") in the media feature tag under the Contact header field, the network computing device may skip or otherwise not perform CRS negotiations with the wireless device, thereby reducing the signaling involved in completing an incoming call connection to the wireless device.

FIG. 1 is a system block diagram illustrating an example communication system 100 suitable for implementing any of the various embodiments. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110a may communicate with the communication network 140 over a wired or wireless communication link 126. The wireless device 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-120e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some embodiments, two or more wireless devices 120a-120e (for example, illustrated as the wireless device 120a and the wireless device 120e) may communicate directly using one or more sidelink channels 124 (for example, without using a base station 110a-110d as an intermediary to communicate with one another). For example, wireless device 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a.

The wireless device 120a-120e may be configured to monitor channel conditions and report the channel conditions to the base station 110a-110d. For example, a channel condition may be indicated in channel state information (CSI) reported by the wireless device 120a-120e to the base station 110a-110d. CSI reported by the wireless device 120a-120e may include a channel quality indicator (CQI) index value indicated in a channel state feedback (CSF) report sent from the wireless device 120a-120e to the base station 110a-110d. CSI may be reported by the wireless device 120a-120e to the base station 110a-110d physical uplink control channel (PUCCH) or physical uplink shared channel (PUSCH). CQI index values may be observed or estimated channel measurements sent by the wireless device 120a-120e to the base station 110a-110d as an index value to indicate channel quality. CQI index values may be integer values, such as values 0-15, that indicate the quality of the DL channel as observed or estimated by the wireless device 120a-120e.

The base station 110a-110d may be configured to select wireless devices 120a-120e to receive broadcast packets based on channel quality estimates, such as based on channel conditions reported by the wireless devices 120a-120e in CSI reported by the wireless devices 120a-120e. CQI index values may be used by the base station 110a-110d to determine a modulation and coding scheme (MCS) value for a wireless device 120a-120e. A base station 110a-110d may construct an MCS pool containing the union of all MCS values determined from the CSI reports from the wireless devices 120a-120e in the cell. During rate control operations the base station 110a-110d may select a minimum MCS value to cover a percentage of the MCS pool, such as 25%, 50%, 100%, and select wireless devices 120a-120e having an MCS at or above the minimum MCS value to receive broadcast packets. Wireless devices 120a-120e having an MCS below the minimum MCS value may not be selected to receive broadcast packets.

Figure 2:
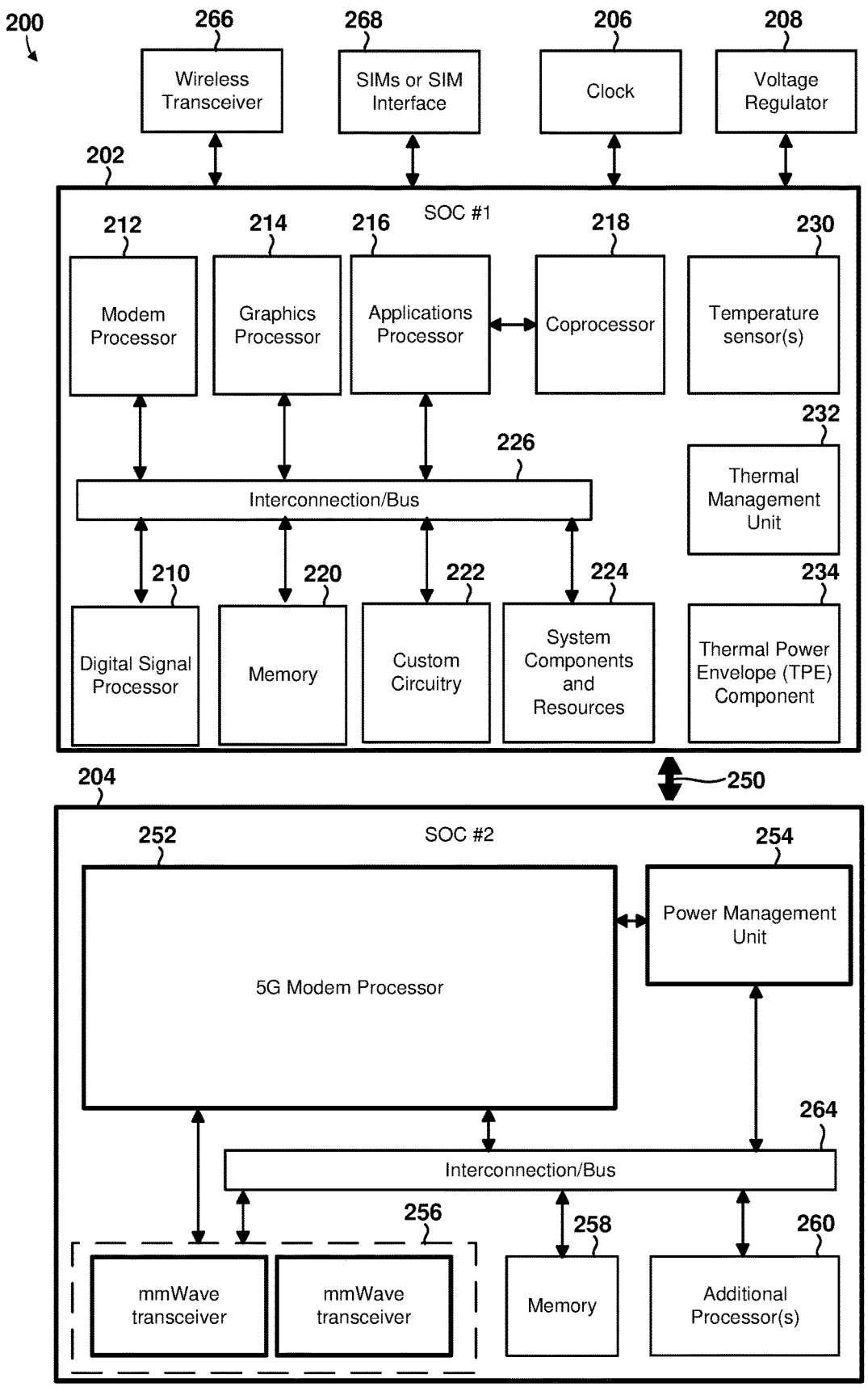
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments.

Various embodiments may be implemented on a number of single processor and multiprocessor computer systems, including a system-on-chip (SOC) or system in a package.

With reference to FIGS. 1 and 2, the illustrated example wireless device 200 (which may be a system-in-a-package in some embodiments) includes a two SOCs 202, 204 coupled to a clock 206, a voltage regulator 208, at least one subscriber identity module (SIM) 268 and/or a SIM interface and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, and at least one SIM 268 and/or SIM interface (i.e., an interface for receiving one or more SIM cards). Resources external to the SOC (e.g., clock 206, voltage regulator 208) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, etc.

In addition to the example system-in-a-package 200 discussed above, various embodiments may be implemented in a wide variety of computing systems, which may include a single processor, multiple processors, multicore processors, or any combination thereof.

Figure 3:
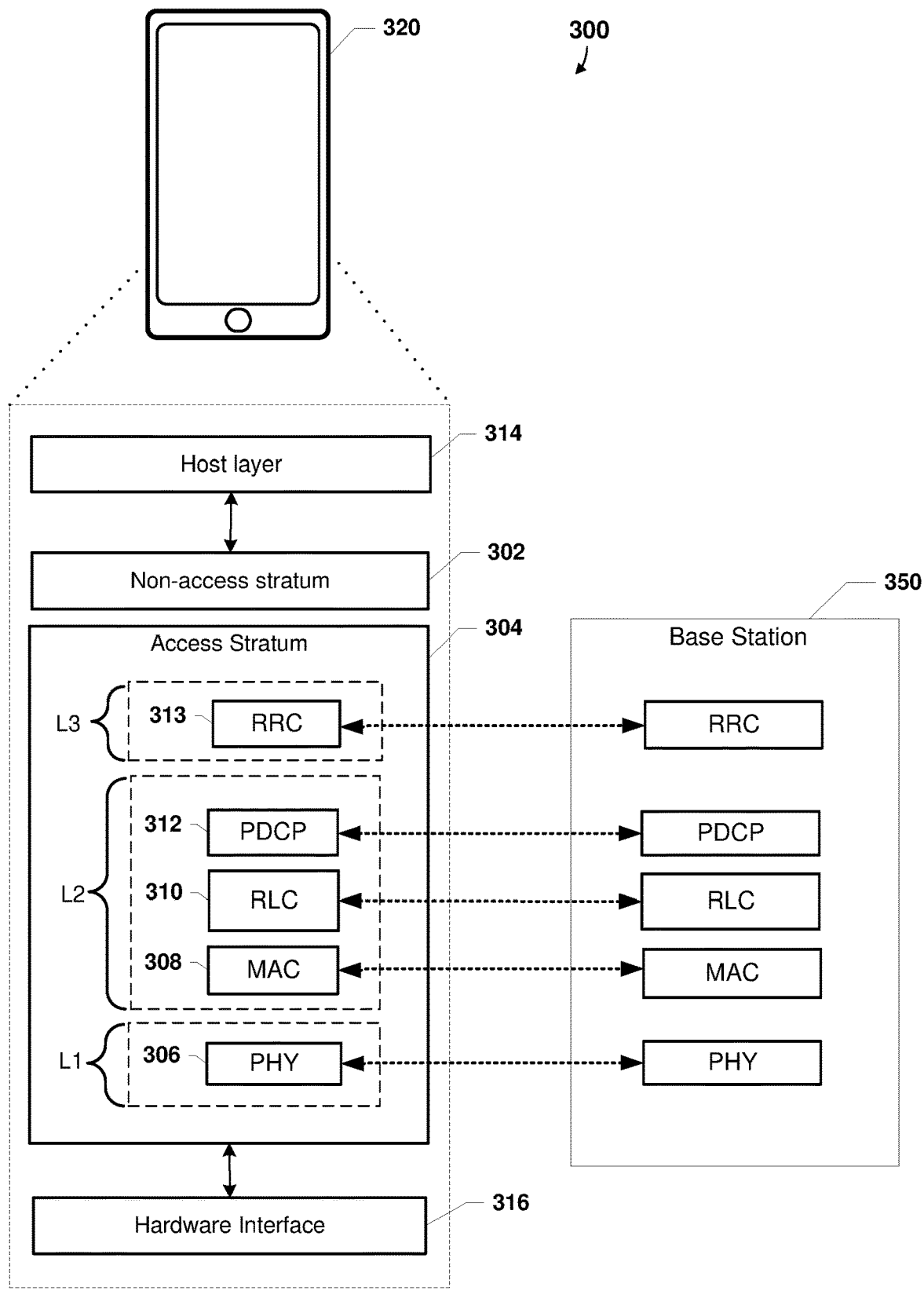
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a-d) of a communication system (e.g., 100). In some embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The PHY layer 306 may include various logical channels, including the Physical Downlink Control Channel (PDCCH) and the Physical Downlink Shared Channel (PDSCH). As an example, the PHY layer 306 may support CSI measurements and reporting (e.g., CQI measurements and reporting).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
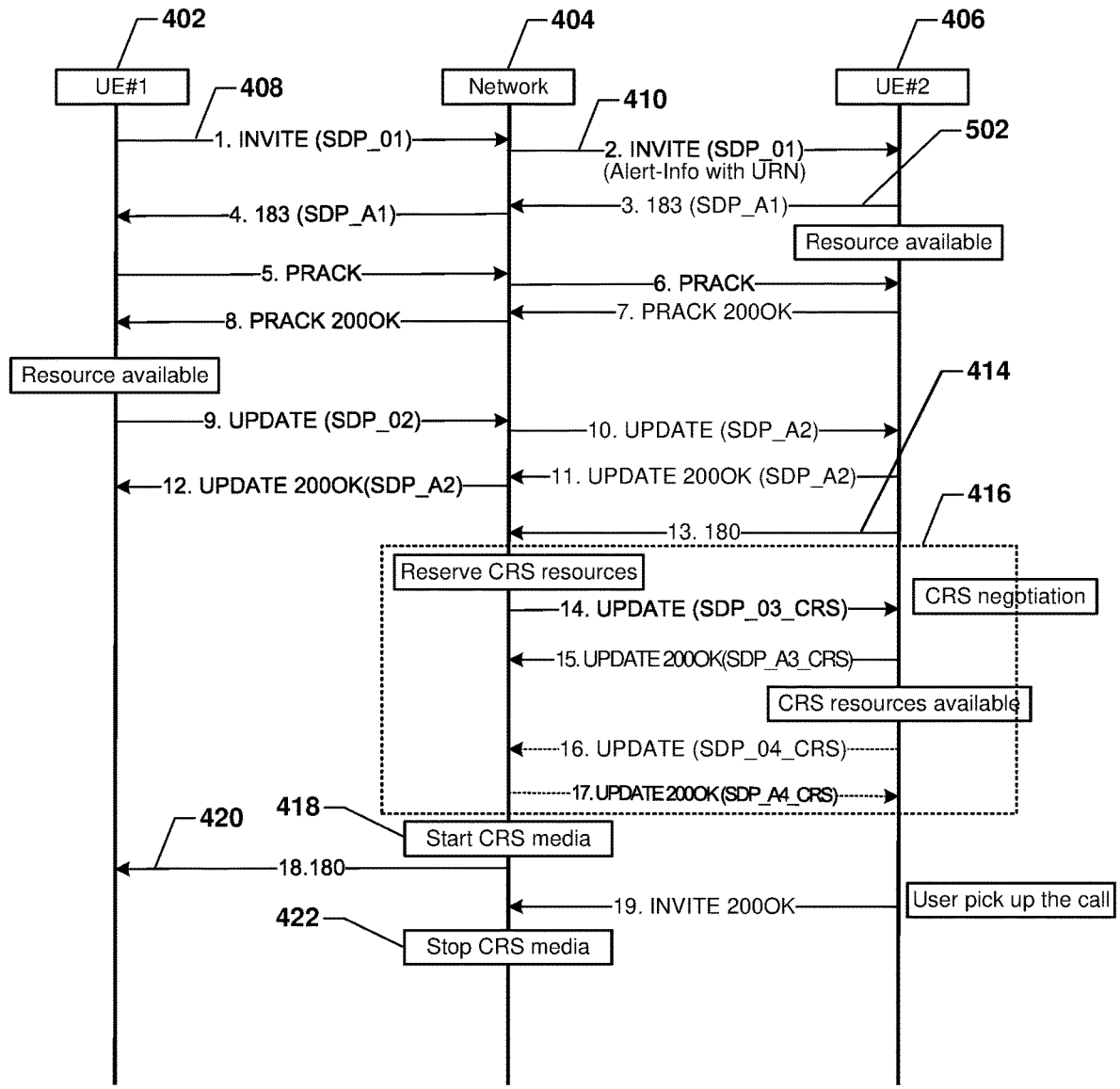
FIG. 4 is a message flow diagram illustrating message exchanges between an initiating wireless device (i.e., the calling UE) and a network and between the network and a called wireless device (i.e., the terminating UE) during a conventional call connection procedure in a network that provides CRS service.

FIG. 4 is a message flow diagram illustrating message exchanges between an initiating wireless device (i.e., the calling UE) and a network and between the network and a called wireless device (i.e., the terminating UE) during a conventional call connection procedure in a network that provides CRS service. With reference to FIGS. 1-4, the conventional a network computing device 404 receiving an INVITE message 408 (message 1) from a calling wireless device 402 (UE #1) for a called wireless device 406 (UE #2), the network computing device 404 will send an INVITE message 410 (message 2) to the called wireless device 406 that informs the device that a call is incoming. In networks configured to provide Gateway CRS service, the INVITE message 410 may include a URN in an alert information field identifying that capability. After exchanging further messages among the calling wireless device 402, the network 404 and the called wireless device 406 in messages 3-12, the network 404 may receive a ring "180" message 414 (message 13) indicating the called wireless device 406 is ready to being ringing to announce the income call. In response, the network may begin CRS negotiations 416 in which the network reserved CRS resources (e.g., a ring tone) and transfers the information to the called wireless device 406 if the device is configured to support CRS functionality. At the completion of the CRS negotiations 416, the network may start the CRS media 418, conveying the sound in a local ring back to the calling wireless device 402 in a ring message "180" 420 (message 18), and continue to do so until the user picks up the call (indicated in message 19), at which point the network stops the CRS media in block 422 and completes the call connection.

Figure 5:
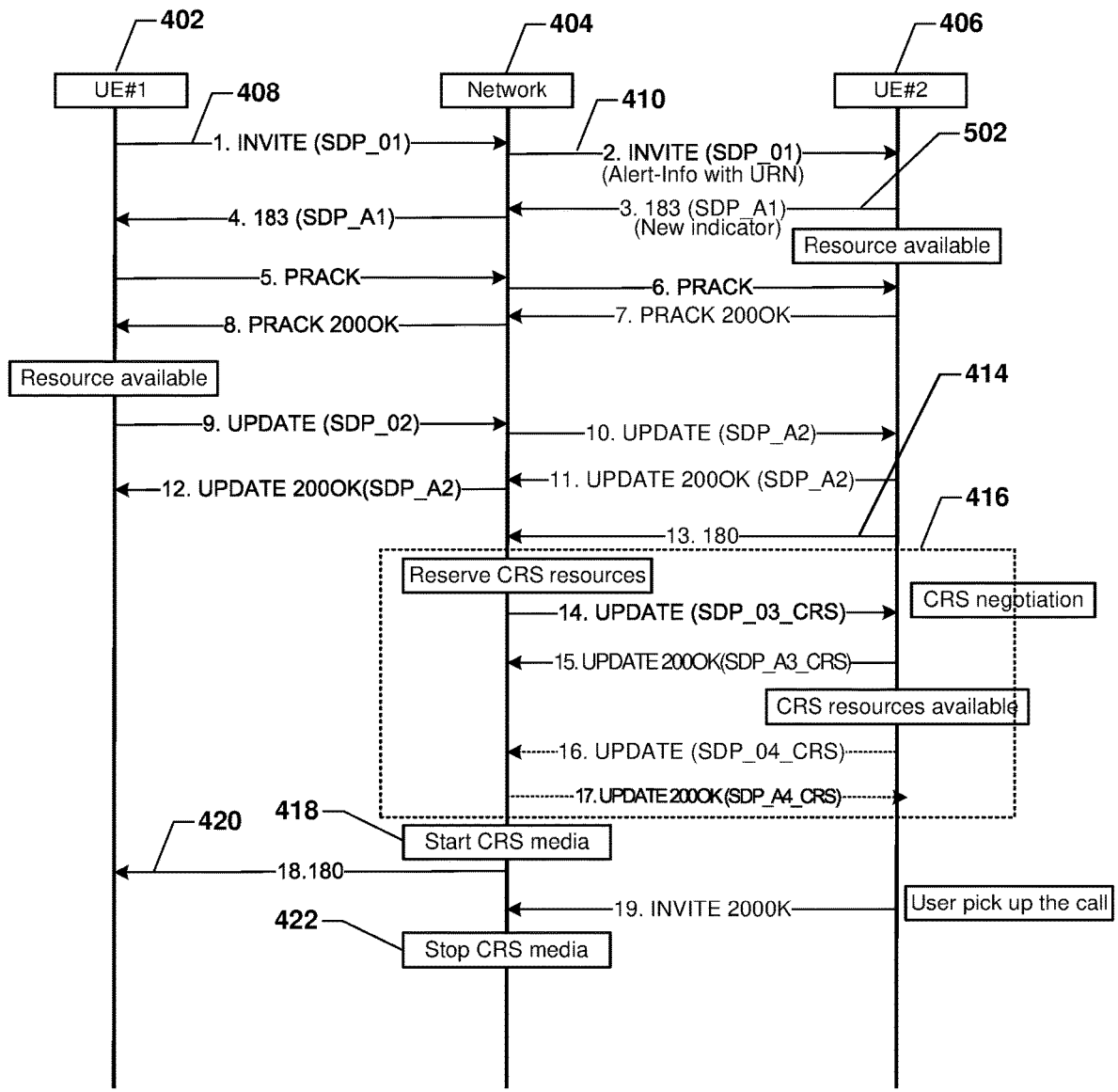
FIG. 5 is a message flow diagram illustrating message exchanges between an initiating wireless device (i.e., the calling UE) and a network and between the network and a called wireless device (i.e., the terminating UE) during a call connection procedure according to various embodiments in which the network provides CRS service and the called wireless device signals CRS functionality.

FIG. 5 is a message flow diagram illustrating message exchanges between an initiating wireless device (i.e., the calling UE) and a network and between the network and a called wireless device (i.e., the terminating UE) during a call connection procedure according to various embodiments in which the network provides CRS service and the called wireless device signals CRS functionality. With reference to FIGS. 1-5, the call announcement signaling between the calling party 402, the network 404, and the called wireless device 406 (i.e., messages and operations 410-422) with the exception of the first reliable SIP message 502 from the called wireless device 406 to the network 404 in response to the INVITE message 410. In various embodiments, the called wireless device 406 will include a new indicator or SIP media feature tag in the Contact header field of the SIP message 502 if the device is configured to support CRS functionality. If so, the network will recognize the CRS indicator (e.g., a SIP g.3gpp.crs-gateway media feature tag) and perform the CRS negotiations 416 and start the CRS media 418 as described. However, if the network determines that the SIP message 502 does not include an indicator or SIP media feature tag indicating that the called wireless device 406 does not support CRS functionality, the network may not perform the CRS negotiations 416, and convey to the calling party 402 a default ring sound in a local ring back in ring message 420 without starting CRS media (i.e., not performing blocks 418 or 422).

Figure 6:
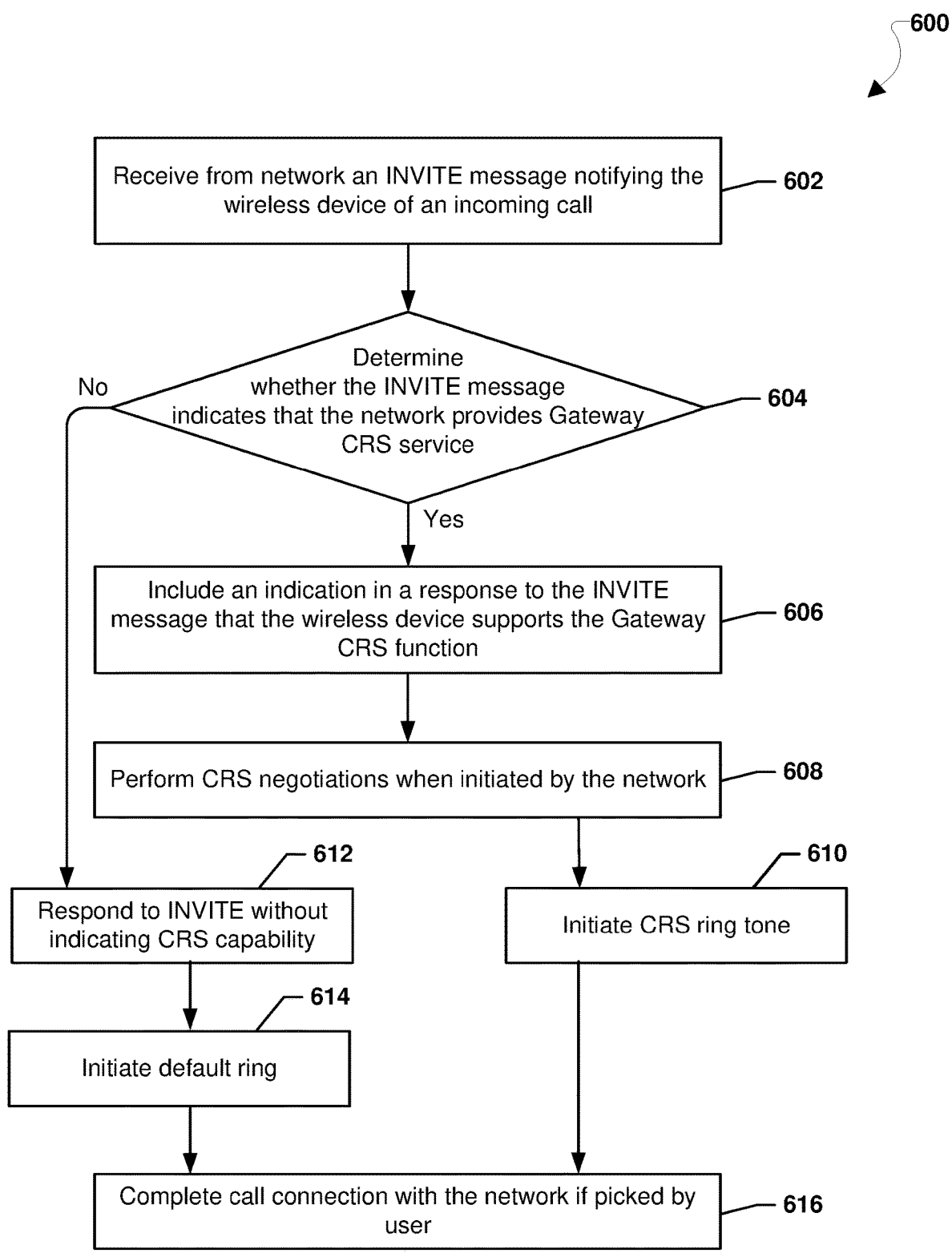
FIG. 6 is a process flow diagram illustrating a method for configuring an opportunistic reception mode in accordance with various embodiments.

FIG. 6 is a process flow diagram illustrating a method 600 that may be performed by a processor of a wireless device for signaling a network regarding CRS capability of the wireless device in accordance with various embodiments. With reference to FIGS. 1-6, the method 600 may be implemented by a processor of a wireless device (e.g., 120a-120e) communicating with a computing device of a network, such as a base station (e.g., 110a-d, 350).

In block 602, the processor may perform operations including receiving from the network an INVITE message notifying the wireless device of an incoming call.

In determination block 604, the processor may perform operations including determining whether the INVITE message indicates that the network provides CRS service. In some embodiments, the processor may parse header fields of the received INVITE message to determine whether the INVITE message includes an alert information header field indicating that the network provides CRS service. In some embodiments, the processor may evaluate an alter information header field to determine whether the field includes a URN identifying CRS as a network service. As an example, the processor may determine whether a header field includes a URN such as urn:alert:service:crs.

In response to determining that that the INVITE message does not indicate that the network provides CRS (i.e., determination block 604="No"), the processor may respond to the INVITE message without indicating CRS capability in block 612, and initiate a default ring in block 614.

Wireless devices that are not configured to support CRS service may not perform the operations of the method 600, and thus may perform the operations in blocks 612 and 614 following receiving an INVITE message in block 602. In some embodiments, a processing device (e.g., 200) for use in wireless devices may be configured to perform the method 600 even though some wireless devices using the processing device may not be configured to support CRS service. In such embodiments, the processor may determine whether the wireless device is configured to support CRS functionality and perform the operations in determination block 604 in response to determining that the wireless device supports CRS functionality. In such embodiments, if the processor determines that the wireless device does not support CRS functionality, the processor may perform the operations in block 612 following receiving an INVITE message in block 602 regardless of whether the INVITE message indicates that the network provides CRS service.

In response to determining that the INVITE message indicates that the network provides CRS service if the wireless device supports a CRS function (i.e., determination block 604="Yes"), the processor may perform operations including an indication in a response to the INVITE that the wireless device supports the CRS function in block 606. In some embodiments, the processor may insert an identifier of CRS function support in a first reliable session initiation protocol (SIP) message sent to the network in reply to the INVITE message. In some embodiments, the identifier of CRS function support in the first reliable SIP message sent to the network in response to the INVITE message may be a media feature tag indicating support for Gateway CRS that is included within a contact header field of the SIP message.

In block 608, the processor may perform operations including performing CRS negotiations when initiated by the network, and initiate the CRS ring tone in block 610.

If a user accepts the incoming call, the processor may compete the call connection with the network in a conventional manner in block 616.

Figure 7:
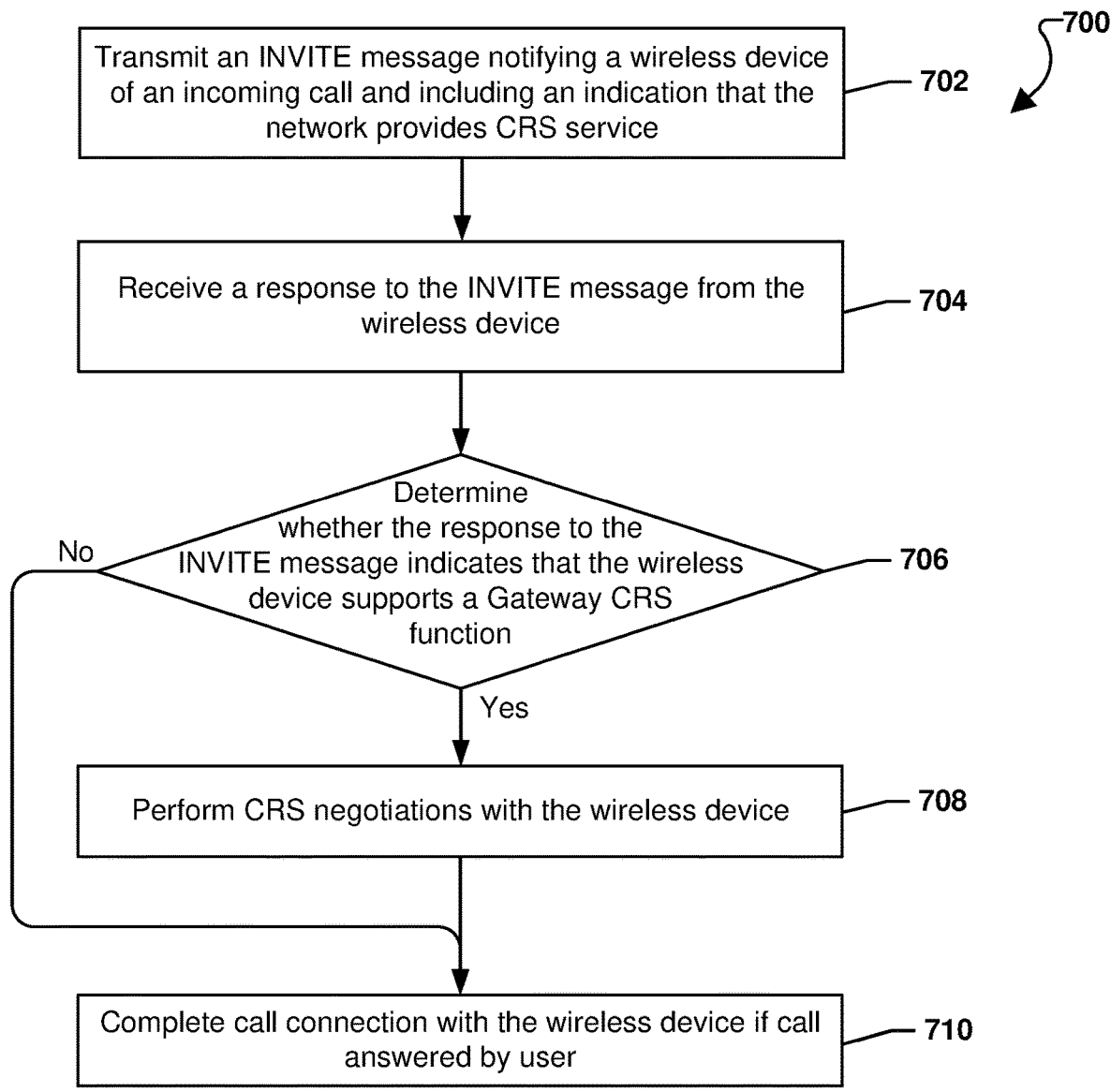
FIG. 7 is a process flow diagram illustrating a method for supporting opportunistic broadcast reception in accordance with various embodiments.

FIG. 7 is a process flow diagram illustrating a method 700 for supporting opportunistic broadcast reception in accordance with various embodiments. With reference to FIGS. 1-7, the method 700 may be implemented by a processor of a network computing device (e.g., a base station 110a-d, 350).

In block 702, the processor may perform operations including transmitting an INVITE message to a wireless device informing the wireless device of an incoming call, wherein the INVITE message includes an indication that the network provides CRS service. In some embodiments, the INVITE message may include an alert information header field in the INVITE message that indicates that the network provides CRS service. In some embodiments, the alert information header field may include a URN identifying CRS as a network service.

In block 704, the processor may perform operations including receiving a response to the INVITE message from the wireless device.

In determination block 706, the processor may perform operations including determining whether the response to the INVITE message indicates that the wireless device supports a CRS function. In some embodiments, the processor may determine whether an identifier of CRS function support is included in a first reliable SIP message received in response to the INVITE message. In some embodiments, the processor may determine whether a media feature tag indicating support for Gateway CRS is included within a Contact header field of the first SIP message.

In response to determining that the response to the INVITE message indicates that the wireless device supports a CRS function (i.e., determination block 706="Yes"), the processor may perform operations including performing a CRS negotiation with the wireless device in block 708.

In block 710, the processor may perform operations including completing a connection of the incoming call with the wireless device (i.e., terminating UE) if answered by the user.

In response to determining that the response to the INVITE message does not that the wireless device supports a CRS function (i.e., determination block 706="No"), the processor may complete a connection of the incoming call without performing the CRS in block 710.

Figure 8:
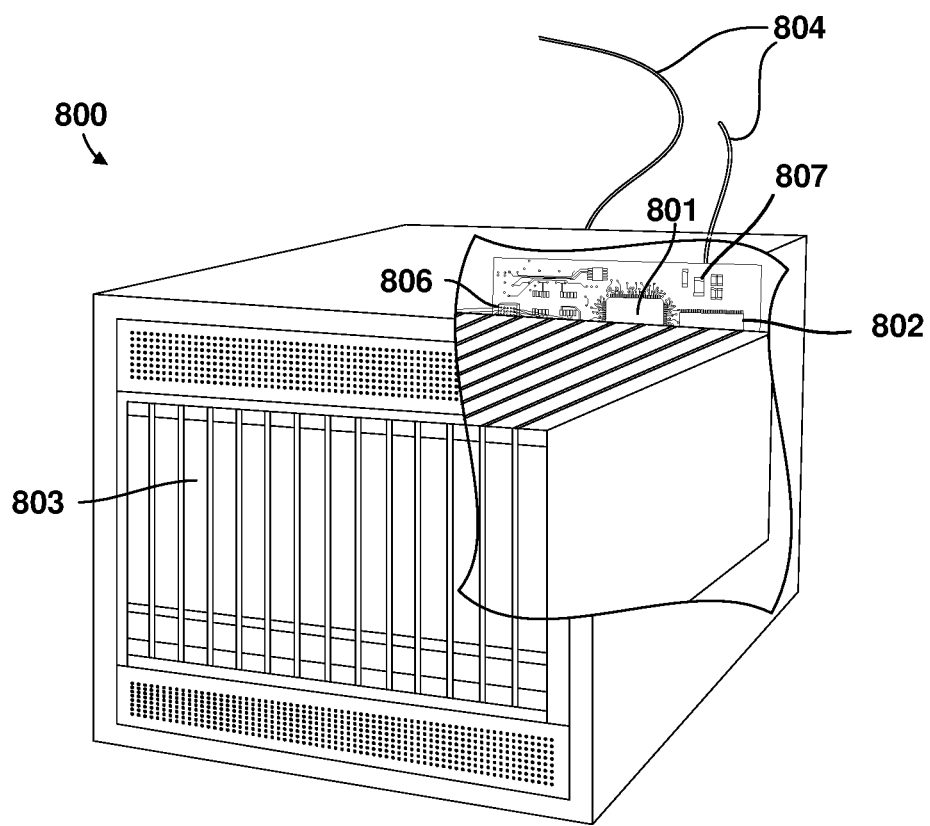
FIG. 8 is a component block diagram of a network computing device suitable for use with various embodiments.

FIG. 8 is a component block diagram of a network computing device 800, such as a base station (e.g., base station 110a-d, 350), suitable for use with various embodiments. Such network computing devices (e.g., base stations, such as gNBs, eNBs, etc.) may include at least the components illustrated in FIG. 8. With reference to FIGS. 1-8, the network computing device 800 may include a processor 801 coupled to volatile memory 802 and a large capacity nonvolatile memory, such as a disk drive 803.

The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers.

The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
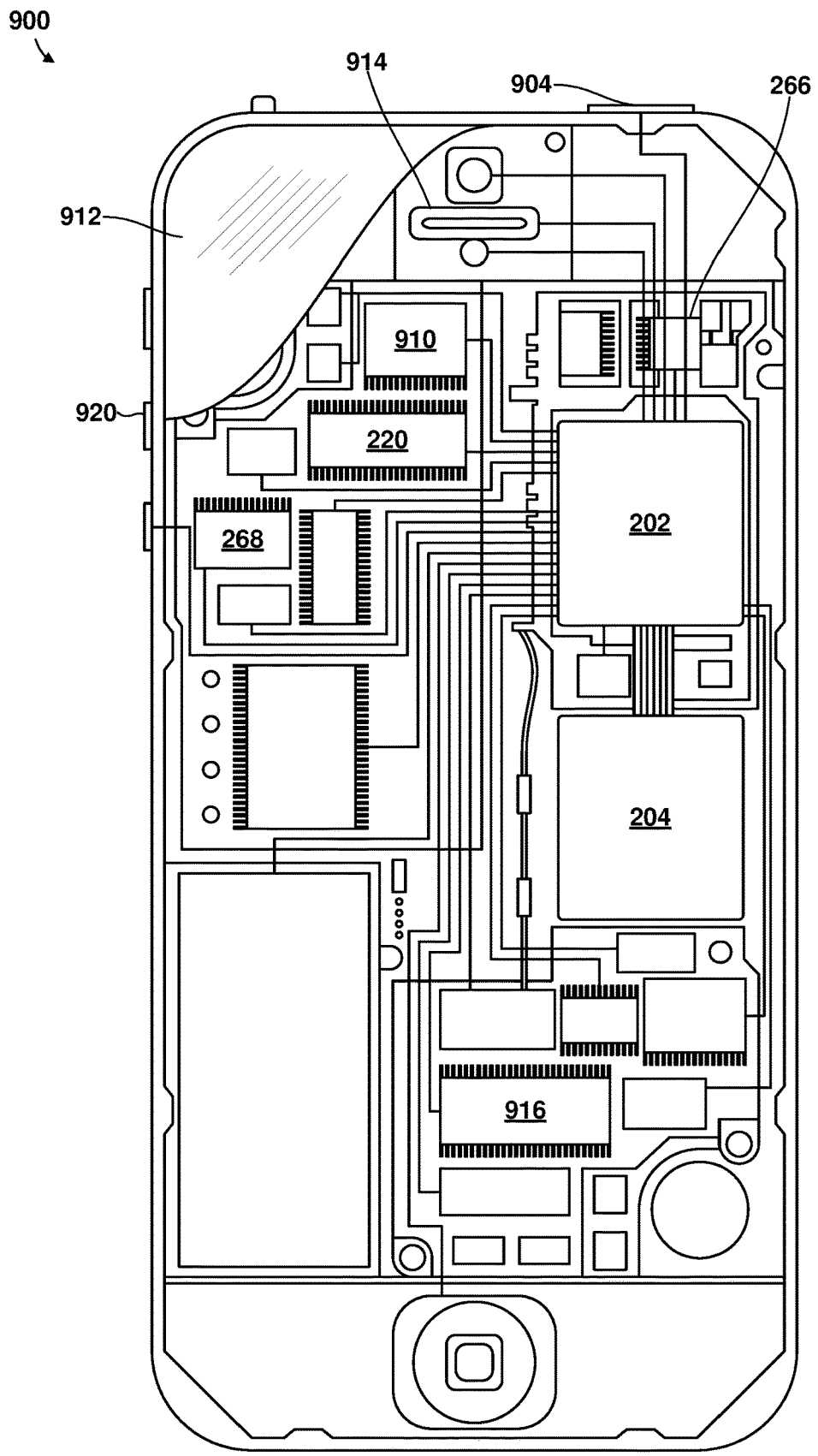
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 900 (e.g., the wireless device 120a-120e, 200, 320, 120a-120e), an example of which is illustrated in FIG. 9 in the form of a smartphone. The wireless device 900 may include a first SOC 202 (e.g., a SOC-CPU) coupled to a second SOC 204 (e.g., a 5G capable SOC). The first and second SOCs 202, 204 may be coupled to internal memory 916, a display 912, and to a speaker 914. The first and second SOCs 202, 204 may also be coupled to at least one SIM 268 and/or a SIM interface that may store information supporting a first 5GNR subscription and a second 5GNR subscription, which support service on a 5G non-standalone (NSA) network.

The wireless device 900 may include an antenna 904 for sending and receiving electromagnetic radiation that may be connected to a wireless transceiver 266 coupled to one or more processors in the first and/or second SOCs 202, 204. The wireless device 900 may also include menu selection buttons or rocker switches 920 for receiving user inputs.

The wireless device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 800 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 220, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for signaling a network regarding customized ringing signal (CRS) capability, comprising:
receiving from the network a first INVITE message notifying the wireless device of a first incoming call;
determining the first INVITE message indicates that the network provides a first CRS service and the wireless device supports a CRS function;
including an indication in a response to the first INVITE message that the wireless device supports the CRS function in response to determining that the first INVITE message includes an alert information header field indicating that the network provides the first CRS service;
receiving from the network a second INVITE message notifying the wireless device of a second incoming call;
determining the second INVITE message indicates that the network does not provide the second CRS service; and
providing a response to the second INVITE message without the alert information header field to initiate a default ring.

2. The method of claim 1, wherein determining whether the first INVITE message includes an alert information header field indicating that the network provides the first CRS service comprises determining whether the alert information header field includes a universal resource name (URN) identifying CRS as a network service.

3. The method of claim 1, wherein including an indication in a response to the first INVITE if the wireless device supports a CRS function comprises inserting an identifier of CRS function support in a first reliable session initiation protocol (SIP) message sent to the network in reply to the first INVITE message.

4. The method of claim 3 wherein the identifier of CRS function support in the first reliable SIP message sent to the network in response to the first INVITE message comprises a media feature tag indicating support for Gateway CRS that is included within a contact header field of the SIP message.

5. A wireless device, comprising:
a wireless transceiver; and
a processor coupled to the wireless transceiver and configured with processor-executable instructions to:
receive from a network a first INVITE message notifying the wireless device of an incoming call;
determine whether the first INVITE message indicates that the network provides CRS service if the wireless device supports a CRS function;
include an indication in a response to the first INVITE that the wireless device supports the CRS function in response to determining that the first INVITE message includes an alert information header field indicating that the network provides CRS service;
receive from the network a second INVITE message notifying the wireless device of a second incoming call;
determine the second INVITE message indicates that the network does not provide the second CRS service; and
provide a response to the second INVITE message without the alert information header field to initiate a default ring.

6. The wireless device of claim 5, wherein the processor is further configured with processor-executable instructions to determine whether the first INVITE message indicates that the network provides first CRS service by determining whether the first INVITE message includes an alert information header field indicating that the network provides the first CRS service.

7. The wireless device of claim 6, wherein the processor is further configured with processor-executable instructions to determine whether the first INVITE message includes an alert information header field indicating that the network provides the first CRS service by determining whether the alert information header field includes a universal resource name (URN) identifying the first CRS as a network service.

8. The wireless device of claim 5, wherein the processor is further configured with processor-executable instructions to determine include an indication in a response to the first INVITE if the wireless device supports a CRS function by inserting an identifier of CRS function support in a first reliable session initiation protocol (SIP) message sent to the network in reply to the first INVITE message.

9. The wireless device of claim 8 wherein the identifier of CRS function support in the first reliable SIP message sent to the network in response to the first INVITE message comprises a media feature tag indicating support for Gateway CRS that is included within a contact header field of the SIP message.

10. A method performed by a processor of a network computing device for providing customized ringing signal (CRS) service by a network, comprising:
transmitting a first INVITE message to a wireless device informing the wireless device of an incoming call, wherein the first INVITE message includes an indication that the network provides CRS service;
receiving a response to the first INVITE message from the wireless device;
determining the response to the first INVITE message indicates that the wireless device supports a CRS function;
performing a CRS negotiation with the wireless device in response to determining that response to the first INVITE message indicates that the wireless device supports the CRS function;
completing connection of the incoming call without performing the CRS negotiation in response to determining that response to the first INVITE message does not indicate that the wireless device supports the CRS function;
transmitting a second INVITE message to a wireless device informing the wireless device of an incoming call, wherein the second INVITE message includes an indication that the network provides CRS service; and
receiving a response to the second INVITE message without an alert information header field to initiate a default ring.

11. The method of claim 10, wherein the alert information header field includes a universal resource name (URN) identifying CRS as a network service.

12. The method of claim 10, wherein determining whether the response to the first INVITE message indicates that the wireless device supports a CRS function comprises determining whether an identifier of CRS function support is included in a first reliable session initiation protocol (SIP) message received in response to the first INVITE message.

13. The method of claim 12, wherein determining whether an identifier of CRS function support is included in a first reliable SIP message received in response to the first INVITE message comprises determining whether a media feature tag indicating support for Gateway CRS is included within a Contact header field of the first SIP message.

14. A network computing device for use in a network, comprising:
a processor coupled to a wireless transceiver and configured with processor-executable instructions to:
transmit an INVITE message to a wireless device informing the wireless device of an incoming call, wherein the INVITE message includes an indication that the network provides CRS service;
receive a response to the INVITE message from the wireless device;
determine whether the response to the INVITE message indicates that the wireless device supports a CRS function;
perform a CRS negotiation with the wireless device in response to determining that response to the INVITE message indicates that the wireless device supports the CRS function;
complete connection of the incoming call without performing the CRS negotiation in response to determining that response to the INVITE message does not indicate that the wireless device supports the CRS function;
transmitting a second INVITE message to a wireless device informing the wireless device of an incoming call, wherein the second INVITE message includes an indication that the network provides CRS service; and
receiving a response to the second INVITE message without an alert information header field to initiate a default ring.

15. The network computing device of claim 14, wherein the processor is further configured with processor-executable instructions such that the alert information header field includes a universal resource name (URN) identifying CRS as a network service.

16. The network computing device of claim 14, wherein the processor is further configured with processor-executable instructions to determine whether the response to the first INVITE message indicates that the wireless device supports a CRS function by determining whether an identifier of CRS function support is included in a first reliable session initiation protocol (SIP) message received in response to the first INVITE message.

17. The network computing device of claim 16, wherein the processor is further configured with processor-executable instructions to determine whether an identifier of CRS function support is included in a first reliable SIP message received in response to the first INVITE message by determining whether a media feature tag indicating support for Gateway CRS is included within a Contact header field of the first SIP message.

* * * * *